(No Model.) 6 Sheets—Sheet 1.

J. J. HEYS.
SOLE CUTTING MACHINE.

No. 521,793. Patented June 26, 1894.

Witnesses: Inventor,
John J. Heys (No Model.) 6 Sheets—Sheet 2.
J. J. HEYS.
SOLE CUTTING MACHINE.

No. 521,793. Patented June 26, 1894.

Witnesses:
Inventor.
John J. Heys
by T. W. Porter Atty.

(No Model.) 6 Sheets—Sheet 5.

J. J. HEYS.
SOLE CUTTING MACHINE.

No. 521,793. Patented June 26, 1894.

(No Model.)  6 Sheets—Sheet 6.

J. J. HEYS.
SOLE CUTTING MACHINE.

No. 521,793.  Patented June 26, 1894.

Witnesses:

Inventor
John J. Heys
by T. W. Porter Atty

UNITED STATES PATENT OFFICE.

JOHN J. HEYS, OF LYNN, MASSACHUSETTS, ASSIGNOR OF ONE-HALF TO MAURICE V. BRESNEHAN, OF SAME PLACE.

SOLE-CUTTING MACHINE.

SPECIFICATION forming part of Letters Patent No. 521,793, dated June 26, 1894.

Application filed March 1, 1894. Serial No. 501,902. (No model.)

*To all whom it may concern:*

Be it known that I, JOHN J. HEYS, of Lynn, in the county of Essex and State of Massachusetts, have invented a new and useful Improvement in Sole-Cutting Machines, which will, in connection with the accompanying drawings, be hereinafter fully described, and specifically defined in the appended claims.

Figure 1:
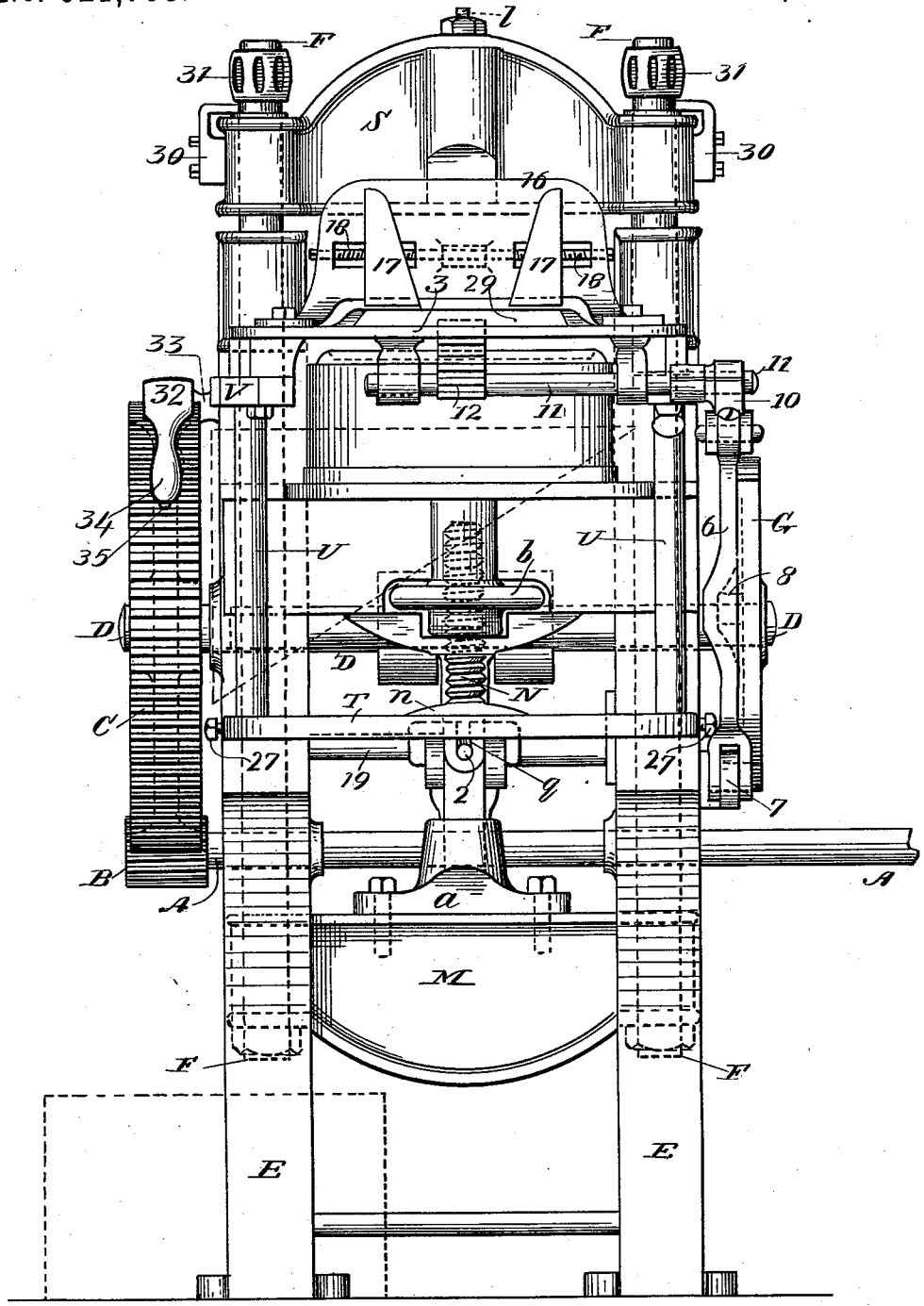
Figure 2:
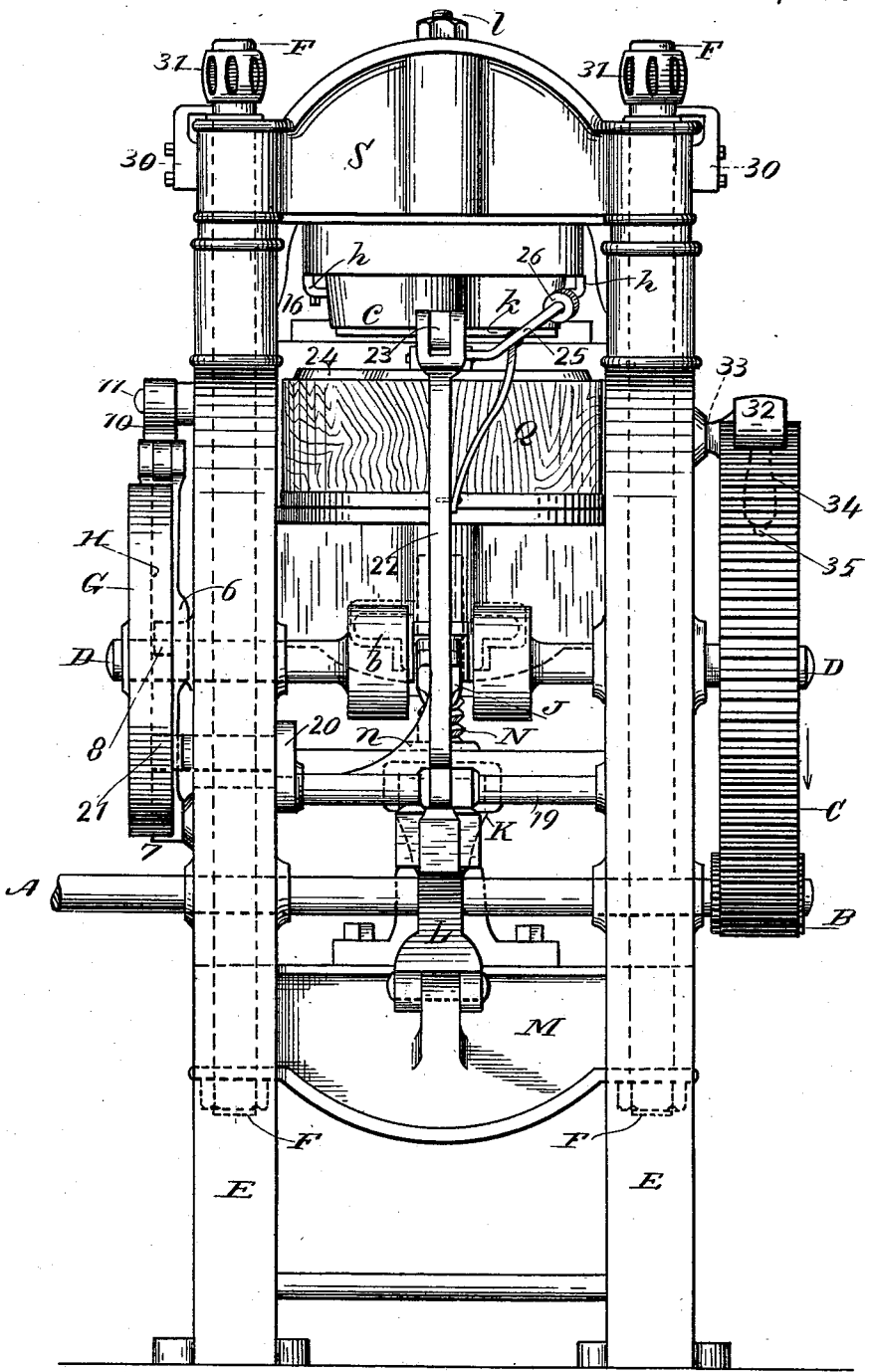
Figure 3:
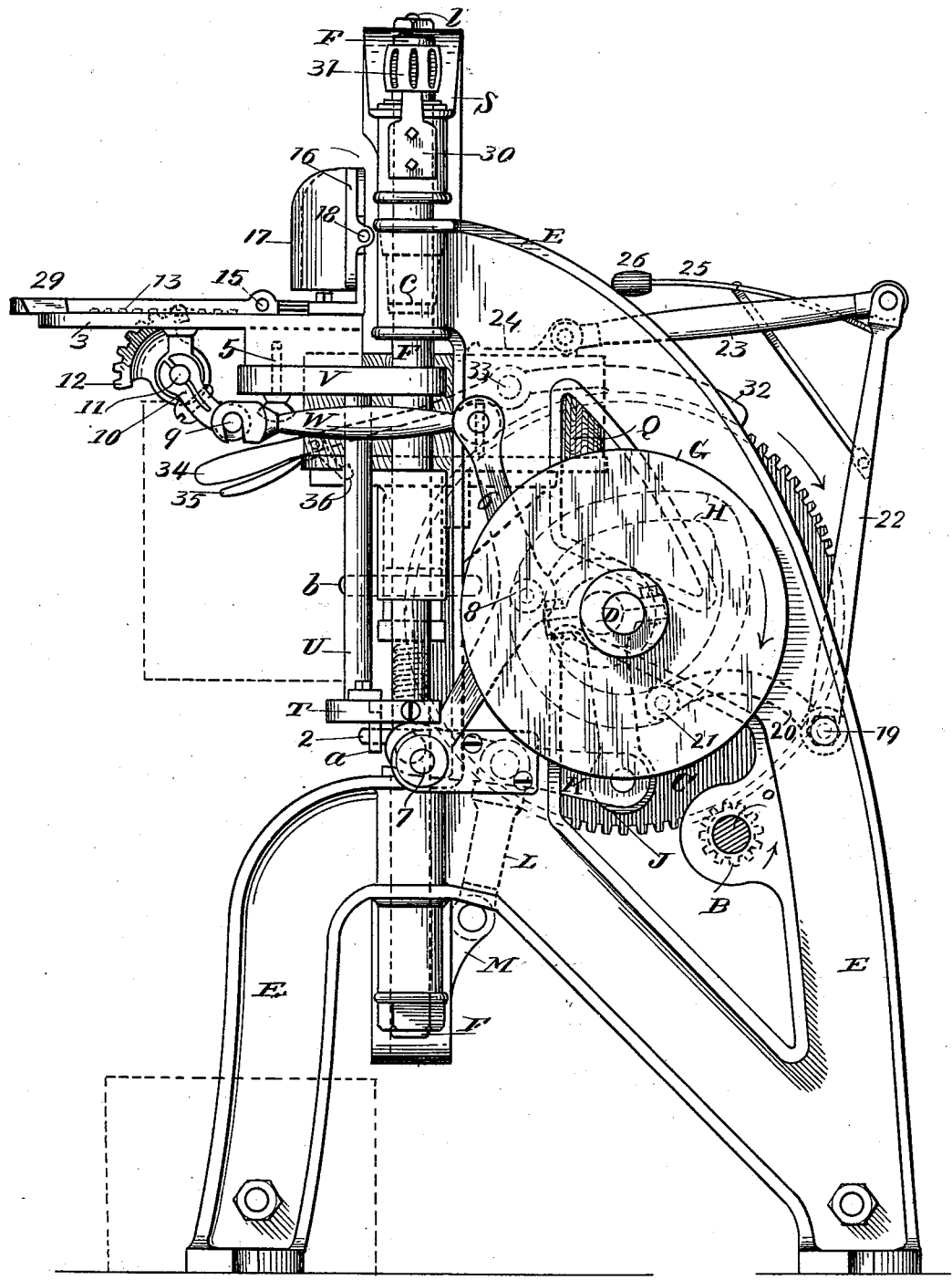
Figure 4:
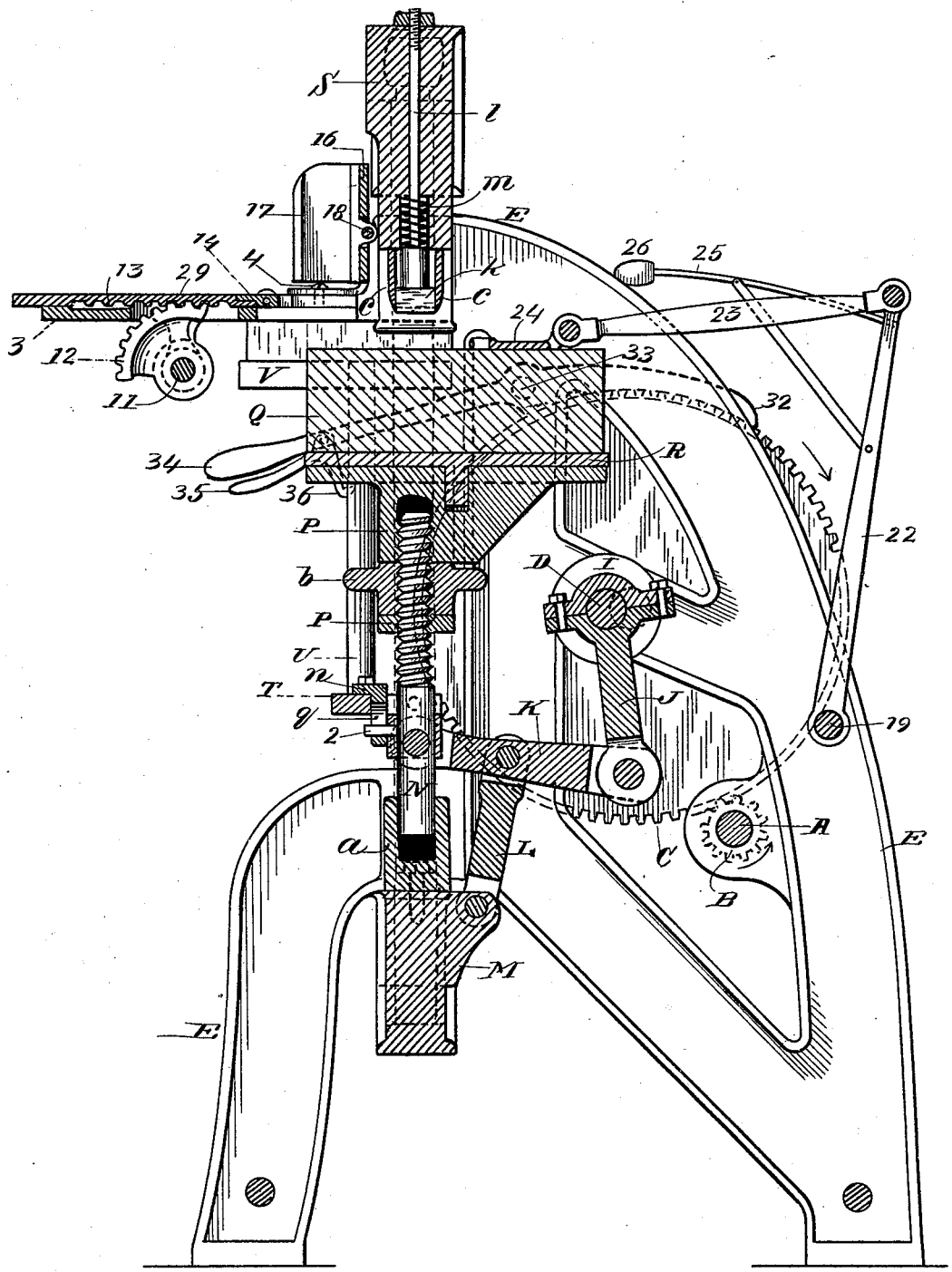
Figure 5:
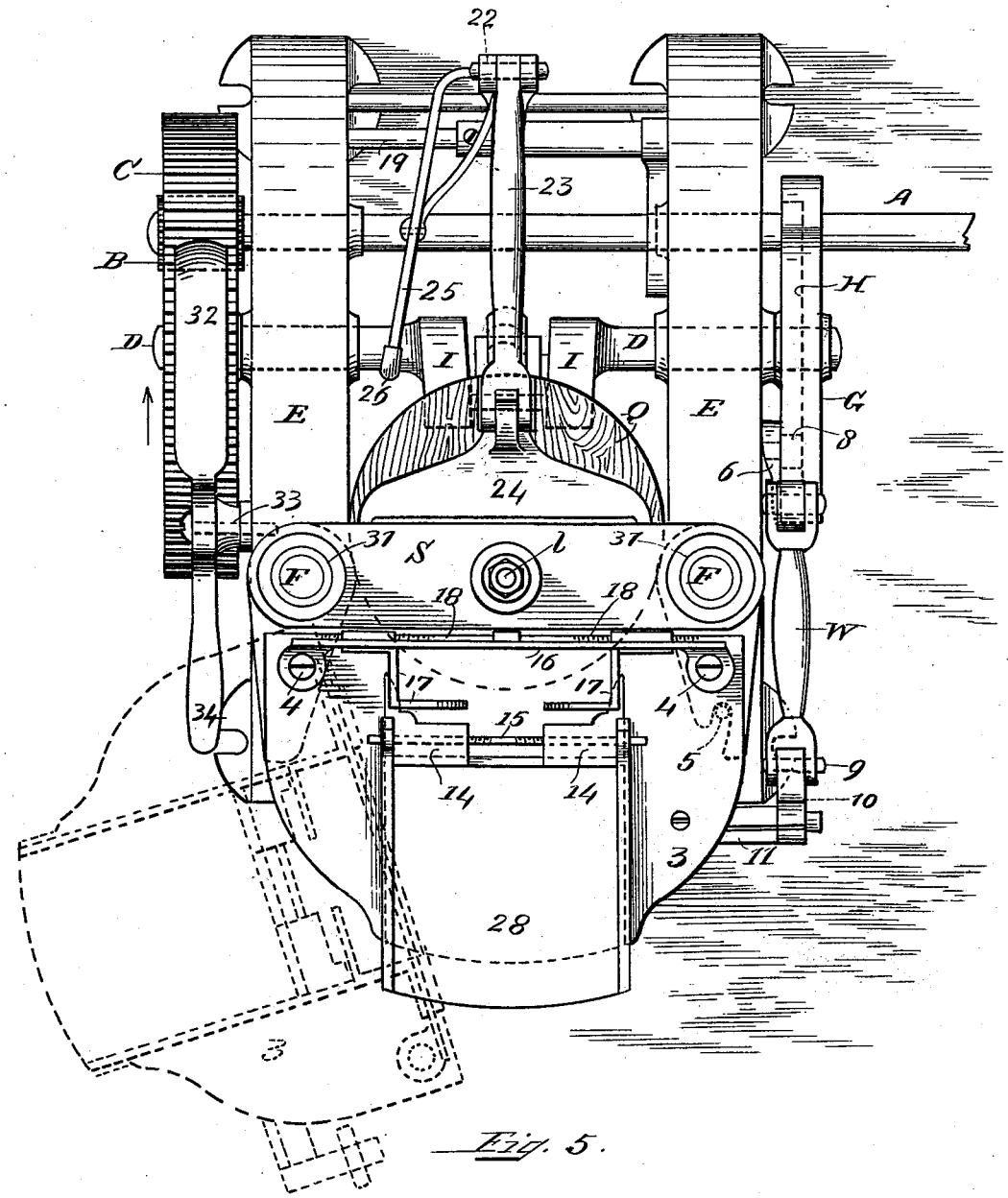
Figure 7:
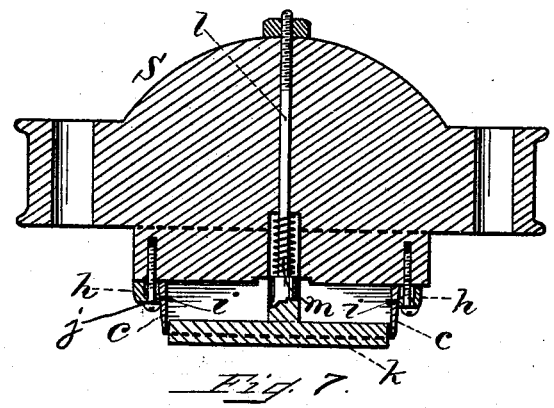

In said drawings, Figure 1 is a front elevation of a machine embodying my invention. Fig. 2 is a rear elevation of the machine shown in Fig. 1. Fig. 3 is a side elevation of the same machine. Fig. 4 is a longitudinal vertical section, viewed from the standpoint of Fig. 3. Fig. 5 is a top plan view of the machine shown in Figs. 1, 2, and 3. Figs. 6 to 9 are details that will be referred to and described.

The object of my invention is to produce a sole cutting machine that will trim off to the correct outline the soles of boots and shoes that have been first cut or blocked out in rough form from the sides of leather; which cutting I effect without the possibility of maiming or injury to the hands of the person operating the machine. And the invention consists in a machine provided with an automatically rotated and reciprocating cutting block, a cutting die, a stacking crib in which to place the soles that are to be cut, a table on which said crib is mounted and a reciprocating feeder so timed in its movements that the soles are delivered therefrom onto said cutting block, a clearer that at each reciprocation of the cutting block clears the top thereof of the sole and remnants, and actuating mechanism by which said parts are properly put in action, including a driving shaft, gearing, a crank shaft, a rocking lever to actuate said cutting block, and a cam device by which the soles are fed beneath the cutting die and by which the clearer is also actuated; as also divers subordinate parts which will in due order be described.

Referring again to said drawings, A represents the driving shaft, which may be actuated by a belt upon a pulley to be secured thereon, by a crank affixed thereto, by gears, or in any known manner. At the opposite end of said shaft it carries a pinion B, which meshes with and rotates gear C, mounted on shaft D, to rotate the same. Said large gear being rotated in the direction indicated by the arrow in Figs. 1, 2, 3, 4, and 5. Said shafts A and D are journaled in the side frames E, E, that support the various parts; said frames are preferably reinforced by the rods F, F, secured in the forward part of frames E in a manner well known.

Upon shaft D at its end opposite to gear C is mounted the cam wheel G, in the side of which is cut the cam groove H, indicated in Figs. 1, 2, 3, and 5, for the purposes to be explained. At the center of its length in shaft D is a crank I, I, on which is mounted the pitman J which at its opposite end is pivoted to the rear end of lever K which near its lineal center is pivoted in upright L, which at its lower end is pivoted to the cross girt M, as is clearly shown in Figs. 2, 3, and 4. Said lever K at its front end is pivoted to the upright vertically reciprocating rod N, as shown in Figs. 1, 3, and 4. Said rod at its lower end is seated and reciprocates in bolster *a* secured on girt M, and at its upper portion it is threaded in nut *b* which is seated in an opening in girt P which carries the cutting block Q that rests on disk R, which has a central pivot seated in girt P, as is shown in Fig. 4. Thus at each revolution of gear C the block P will be carried up and down by the action of crank I, pitman J, lever K, and rod N, as described. The cutting die that co-operates with block Q is shown at *c* and as secured to girt S by small brackets *h* that are formed with pins *i* that enter holes *j* in its ends, and are secured to said girt by screws as specially shown in Fig. 7, which is a longitudinal section of girt S, die *c*, and other parts.

Figure 8:
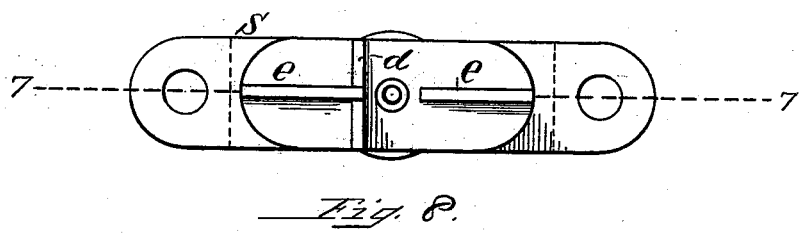
Figure 9:
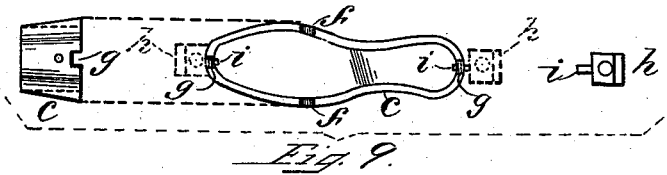

In Fig. 8 the transverse rib *d* and longitudinal rib *e* that aid in holding die *c* in place are clearly shown; and in Fig. 9 the transverse slots *f* and the slots *g, g*, at the sides and ends of die *c* are shown, as also the pin *i* that enters hole *j* to hold said die in place. By thus forming the die and its seat with ribs *d* and *e*, and recesses or slots *f, f*, and *g, g*, the die can always be seated in its exact position, and can thus be secured in place by brackets *h*.

An expeller that expels the cut soles from die *c* is shown at *k*, and is held in place by rod $l$ on which is the retracting spring $m$ which serves to expel the sole.

Figure 6:
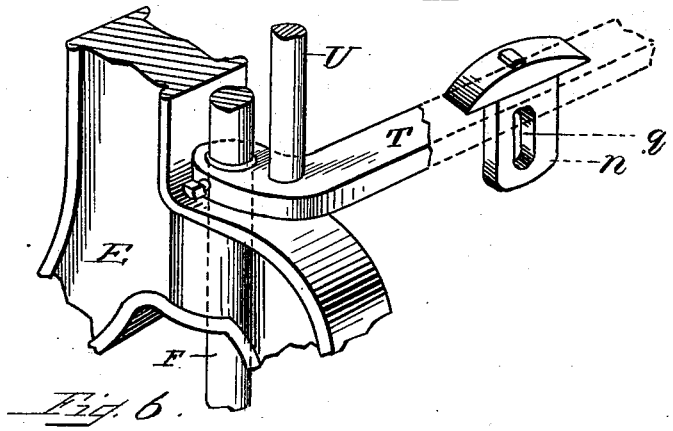

To support and present the soles to block Q the girt T extends across the machine in front of rod N and its ends embrace rods F so as to move thereon, see Fig. 6 and other figures. At the center of girt T is formed or secured a piece $n$ in which is formed a hole $q$ in which is engaged the pin 2 projecting from the front of rod N, see Figs. 1, 3, and 4. The standards U are formed upon and extend upward from girt T and at their upper ends are formed with bars V that embrace rods F to slide thereon; and a table 3 is pivoted by screw 4 to the left hand bar V and is locked to the right hand bar by screw 5 so that said table can be swung to the left if desired by slacking said screw 5 and swinging it on pivot screw 4, for conveniently changing die C. To feed the shoe soles upon block Q and beneath die $c$, a lever 6 pivoted to the side of the machine at 7 carries a trundle 8 that engages in cam groove H in cam wheel G, so as to be actuated back and forth as said wheel rotates. The upper end of lever 6 is pivoted to connecting rod W that engages wrist pin 9 of arm 10, secured upon shaft 11, that carries segmental gear 12, that engages in rack 13, formed upon the under side of feeder 29, or is secured thereto. At the rear of feeder 29 are two parts 14 arranged on the right and left hand screw 15 so that said parts 14 can be moved laterally to adjust them to the length of sole being cut. The soles are stacked within the space inclosed by back plate 16, and the end angle plates 17, which latter are formed with lugs that extend through plate 16 and are engaged by the right and left hand screw 18 that is threaded in said lugs.

At the rear part of the machine is a rock shaft 19, having a rigid arm 20 carrying at its end a roll 21 that engages in and is actuated by cam groove H as shown in Fig. 3. Rising from said rock shaft is an arm 22 that actuates a connector 23 which at its front end is secured to and reciprocates the clearer 24 that rests and slides on block Q. Attached to arm 22 is an arm 25 that carries at its end a buffer 26, that when arm 22 is at almost the limit of its forward movement is brought in contact with block Q and gives to it a slight rotary movement, so that the die $c$ is successively brought in contact with a new surface of said block. Thus by the rotation of crank shaft D, in the direction indicated, block Q is vertically reciprocated by the action of crank I, pitman J, lever K and rod N. Said block being always so adjusted by means of nut $b$ that it will be brought into contact with cutter $c$ to the requisite degree for the cutter to sever the leather beneath it.

By the action of cam G, its lever 6, pitman W, crank 10, and segmental gear 12, engaging rack 13 of feeder 29, it is moved inward and outward in proper time; and by means of the vertically elongated slot $q$ and the pin 2 in rod N the top face of block Q can descend below table 3 and can make a part of its ascent before said table begins to rise, and hence the clearer 24 has ample time to pass beneath said table when the clearer sweeps off the top of the cutting block Q to clear off the cut sole and the fragments. The girt may have the friction screws 27 to bear against rods F to hold table 3 at its highest point till pin 2 descends to the bottom of hole $q$ to bring said table downward.

It is plain that clearer 24 will move forward when block Q is sufficiently below table 3 to allow the clearer to remove all pieces of leather from the cutting block, and that it will be retracted in time to allow the next sole to be placed on said block.

Buffer 26 is brought in contact with block Q to move the same a limited distance for the purpose specified, when the block is free except the light pressure of clearer 24, which does not interfere with said movement.

In case die $c$ becomes very materially worn away, so as not to reach down the proper distance, then to prevent the necessity of further moving block Q upward, the girt S will be slightly lowered the supporters 30 causing said girt to remain in contact with screw nuts 31 secured on rods F on which said girt is supported.

When it is necessary to readjust this machine, as when table 3 is thrown back as shown in Fig. 5 to change die $c$, the machine can then, for safety, be effectually locked by means of segment lever 32 having teeth that engage in the teeth of gear G, which segment is pivoted at 33, and has a handle 34 and a catch lever 35 provided with a hook like catch 36, that locks it to frame E in an obvious way not shown and serves to hold said segment out of contact with gear G.

As machines for cutting blocked-out soles into the shape of the die by a die and revolving block are old, I do not claim anything in that respect; but as there are hundreds of men, boys, and girls who have lost their fingers and in some cases their whole hands on the machines now in use, I do claim for this machine as its special improvement that it will do as much or more work in a day as any machine now in use and at the same time the operator is protected against his own carelessness and can under no circumstances while attending to his regular duties of cutting soles cut off his fingers or hands, the object of the machine being to automatically feed the soles beneath the die and to automatically remove the cut sole and its scrap from the block into a box for its reception without the intervention of the operator, who has only to start the machine, and he has then only to keep the stacker supplied with soles that are to be cut.

As shown by the following explanation, the operator secures the die on the girt S at the head of the machine, and it fits in perfect position by means of ribs $d, e$, that fit in grooves in the die, as stated, thus placing the die in perfect alignment at all times. He then closes the table 3, on which is the stacker or receptacle for soles. He then starts the machine which is driven by power; the first half revolution of the crank shaft causes the slide on the table to push in the lower sole in the stack to its exact position beneath the die; the cutting block continues in its ascent and pressing the sole against the die cuts it into the desired shape on the upward throw of the crank; the block with the cut sole and scraps then descends, and the clearer removes the sole and pieces of leather from the surface of the block. The block then returns by a quick motion to a position to be again ready to act on the next sole. It will be noticed that the back plate 16 of the stacker extends from side to side of the machine and is cut away no more than is necessary to admit the largest sized sole to pass beneath it to be operated upon and that this part 16 forms a guard which effectually prevents the operator from inserting his fingers in the path of movement of the die, the operator occupying a position in front of the machine.

Having thus described my invention, what I claim as new, and desire to secure by Letters Patent, is—

1. In a machine for cutting out shoe soles, a cutting die c, formed with slots g, g at its respective ends, and slots f, f in its respective sides, in combination with girt S formed with longitudinal rib e, e and transverse rib d respectively constructed and arranged to fit the said slots in said cutting die, and means as brackets h formed with pins i to fit in holes j in said die, whereby said die can be quickly and accurately adjusted and secured upon its girt S, as specified.

2. In a machine for automatically feeding and cutting out shoe soles, a rotary cutting block arranged below the cutting die, a clearer arranged to rest on said block and means substantially as described to slide said clearer across said block after the cutting of the respective soles thereon, substantially as specified.

3. In a machine for cutting out shoe soles, a cutting die provided with means for its speedy and certain adjustment as specified, a rotary cutting block in combination with an automatic clearer resting and acting upon the top surface of said block, substantially as specified.

4. In a machine for cutting out shoe soles, a fixed table having a horizontal reciprocating slide arranged therein, a rotary cutting block arranged to be vertically reciprocated from a practical level of said slide to below the same and vice versa, with means to maintain said slide at rest while the block is reciprocated in part of its movement, and a cutting die arranged above said cutting block, substantially as specified.

5. In a machine for cutting out shoe soles the combination of a horizontal cutting block provided with means to intermittently rotate the same, and also provided with means by which it is vertically reciprocated; a cutting die arranged above said cutting block, and a guard arranged in front of said cutting die to prevent the mutilation of the hands of the operator, substantially as specified.

6. In a sole cutting machine, the combination of crank shaft D duly rotated, the pitman J connected with crank I and lever K, said lever, its pivoted fulcrum L, rod N to which lever K is pivoted, block Q seated on girt P, and an adjusting nut by which to adjust the height of said block, substantially as specified.

7. In a sole cutting machine the combination of shaft 19 the upright arm 22 arranged thereon, arm 20 with trundle 21 in the end of arm 20 and arranged to move in cam groove H, the connector 23 carried by upright 22 and clearer 24 arranged upon and adapted to clear the upper face of block Q as it is reciprocated, substantially as specified.

8. In combination with trundle 21 arm 20, upright 22 and arm 25, the buffer 26 arranged to engage block Q and slightly rotate the same at the descent thereof, substantially as specified.

9. In a sole cutting machine the combination of cam wheel G, lever 6 arranged to be actuated by said wheel, connector W engaged with pin 9, crank 10, rock shaft 11, segmental gear 12 and rack 13 to actuate feeder 29, all substantially as specified.

10. In a sole cutting machine and in combination with a rotary block Q arranged to be vertically reciprocated by the rotary motion of shaft D, the reciprocating feeder 28 moving at right angles to said shaft, as described, with intermediate connecting mechanism whereby the rotation of shaft D will reciprocate feeder 28, in conjunction with the motion imparted to said cutting block, substantially as specified.

11. In a sole cutting machine and in combination with vertically reciprocating block Q mounted on rod N the vertically moving girt T, provided with elongated hole q and the pin 2, projecting from rod N and engaging in said hole, whereby block Q will rise a portion of its distance before girt T is moved upward, substantially as specified.

12. In a sole trimming machine the combination of reciprocating slide 28, and the adjustable end pieces 14, arranged to be moved in adjustment by screw 15, substantially as specified.

13. In combination with girt S formed with longitudinal ribs e and transverse ribs d, the die c formed with recesses f for reception of rib d and recesses g to receive ribs e, whereby said die may at all times be correctly positioned in the manner specified.

JOHN J. HEYS.

Witnesses:
TIMOTHY A. BRESNAHAN,
T. W. PORTER.